United States Patent

Schaefer

[15] 3,670,022
[45] June 13, 1972

[54] CONTINUOUS HIGH TEMPERATURE PROCESS FOR O-METHYLPSEUDOUREA HYDROCHLORIDE

[72] Inventor: Frederic Charles Schaefer, Darien, Conn.
[73] Assignee: American Cyanamid Company, Stamford, Conn.
[22] Filed: Nov. 26, 1969
[21] Appl. No.: 880,311

[52] U.S. Cl. ....................................................260/564 E
[51] Int. Cl. .....................................................C07c 123/00
[58] Field of Search.............................................260/564 E

[56] References Cited

OTHER PUBLICATIONS

Kurzer et al., Organic Synthesis Coll. vol IV pp. 645– 648 (1963)
McKee, American Chemical Journal, vol. 26, pp. 206, 243– 248 (1901)

*Primary Examiner*—Leon Zitver
*Assistant Examiner*—Gerald A. Schwartz
*Attorney*—Lawrence W. Flynn

[57] ABSTRACT

Anhydrous methanol, cyanamide, and hydrogen chloride are brought into contact in the presence of from about 100 percent to 300 percent excess methanol at temperatures ranging from 40°–80° C. Reaction proceeds rapidly to produce crystals of O-methylpseudourea hydrochloride which are conveniently separated and recovered from the mother liquor. The rapidity of the reaction and the formation of the product as crystals make the process particularly advantageous for preparing O-methylpseudourea hydrochloride on a continuous basis.

10 Claims, 1 Drawing Figure

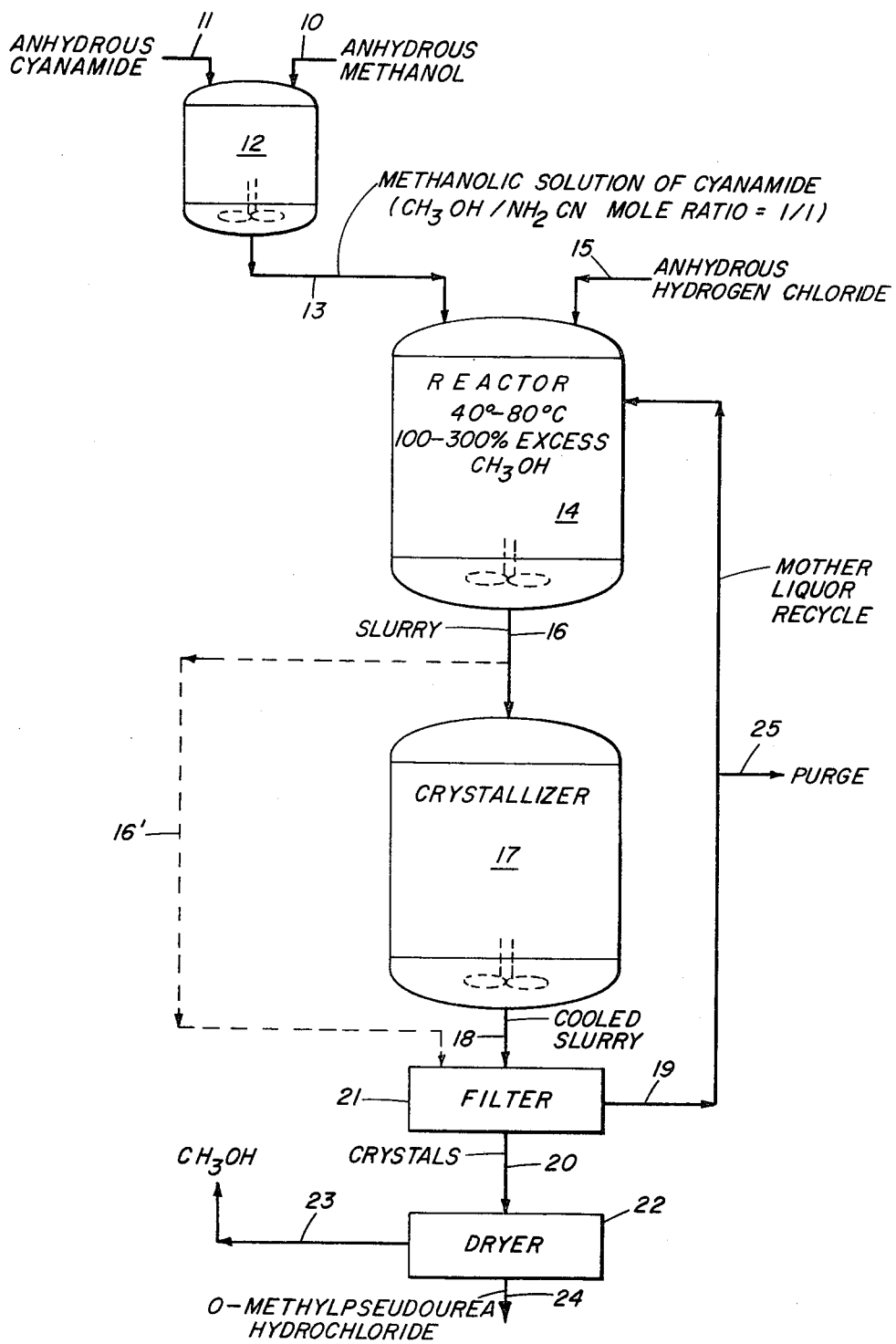

CONTINUOUS HIGH TEMPERATURE PROCESS FOR O-METHYLPSEUDOUREA HYDROCHLORIDE

BACKGROUND OF THE INVENTION

The reaction of methanol, cyanamide, and hydrogen chloride under anhydrous conditions to produce O-methylpseudourea hydrochloride has been known since 1901 when it was described by McKee in Amer. Chem. J. 26, 209, said publication incorporated herein by reference. McKee's basic process has continued to be used with substantially no changes up to the present time. The most complete description of this process is the article by Kurzer and Lawson in Organic Synthesis 34, 69 (1954), said publication incorporated herein by reference. A recent Japanese publication [Kawano and Odo, J. Org. Syn. Chem. Soc. Japan 24, 955 (1966)] indicates the continued use of this process until quite recently.

McKee's basic process consists in producing O-methylpseudourea Hydrochloride by reacting anhydrous methanol, anhydrous cyanamide, and anhydrous hydrogen chloride for long periods of time (3 to 4 days) at low temperature (25° C. or less) in the presence of large excesses (500 to 1,000 percent) of methanol to produce a methanolic solution containing the product. This solution is then evaporated to recover the product. The long reaction time required, the large volume of reaction vessel necessitated by the vast amounts of excess methanol, and the heat required to evaporate such large quantities of methanol are all readily apparent obstacles to the successful commercial development of such a process. The process of this invention provides a convenient method for overcoming the aforementioned drawbacks of the prior art process and provides a most desirable route for the commercial preparation of O-methyl-pseudourea hydrochloride.

SUMMARY OF THE INVENTION

In accordance with the process of this invention, anhydrous methanol, anhydrous cyanamide, and anhydrous hydrogen chloride are brought into reactive contact in the presence of from about 100 percent to about 300 percent excess methanol at a temperature ranging from about 40° to about 80° C. Under such conditions, O-methylpseudourea hydrochloride product is formed almost instantaneously due to the surprisingly high reaction rate obtainable at such elevated temperatures. Moreover, as the reaction proceeds, crystals of O-methylpseudourea hydrochloride appear in the reaction mixture due to the relatively low amounts of excess methanol which are employed.

It has been found that when the temperature of the reaction mixture falls below about 40° C. reaction rates are diminished to the point where excessively long reaction times are required in order to obtain economic product yields. On the other hand, when reaction temperature exceeds about 80° C., decomposition of the O-methylpseudourea hydrochloride product begins to occur. Moreover, the volatility of the alcohol at such high temperatures presents additional processing problems.

It has further been found that if the amount of excess methanol exceeds about 300 percent, it becomes most difficult to obtain crystallization of the product due to the abundance of solvent present whereas a 300 percent excess amount of methanol imparts sufficient fluidity to the reaction to permit it to be readily handled and agitated. On the other hand, if the percent excess methanol falls below about 100 percent the reaction mixture loses fluidity to the point where it becomes extremely difficult to handle.

When reaction temperatures in the upper range of the aforementioned temperature range are employed, reaction occurs at an almost instantaneous rate; as lower temperatures are used, the reaction rate becomes progressively slower, however, reaction times will generally not exceed about one-half hour. It is most surprising that the reaction can be carried out at such elevated temperatures to produce the extremely high product yields, 90–98 percent which are observed with the process of this invention. It had heretofore been thought that O-methylpseudourea hydrochloride would undergo rapid decomposition at such elevated temperatures and hence the prior art teaching of low temperatures and long reaction times. Moreover, it is surprising in view of the high reaction temperatures employed that only minor amounts (1–2 percent) of undesirable by-product urea are formed; this is substantially the same amount of urea as formed in the low temperature prior art process.

It is therefore an object of this invention to provide a high temperature process for preparing O-methylpseudourea hydrochloride in high yield which allows the reaction to proceed in very short reaction times.

It is another object of this invention to provide a process for preparing O-methylpseudourea hydrochloride which permits crystallization of the product thereby providing for convenient recovery of the product without the need for evaporation of large quantities of methanol.

It is a still further object of this invention to provide a process which is eminently suitable for preparing O-methylpseudourea hydrochloride on a continuous basis.

These and other objects of this invention will become apparent to those skilled in this art from a total reading of this specification.

O-Methylpseudourea hydrochloride is useful as an intermediate for preparing substituted s-triazines according to the teachings of U.S. Pat. No. 3,203,550. The s-triazines are useful as agricultural biocides, surface active compounds, dye intermediates, pharmaceutical intermediates, and the like, as pointed out in the above cited patent. O-Methylpseudourea hydrochloride is readily converted into O-methylpseudourea which finds utility as an intermediate in the preparation of a herbicidal acyl derivative of the pseudourea according to the teaching of U.S. Pat. No. 2,780,535. O-Methylpseudourea is also used as an intermediate in the synthesis of a useful pyrimidine as shown in U.S. Pat. No. 2,779,669.

BRIEF DESCRIPTION OF THE DRAWING

The drawing is a schematic flow diagram showing a preferred embodiment of the process of this invention used to produce O-methylpseudourea hydrochloride on a continuous basis.

DESCRIPTION OF THE PREFERRED EMBODIMENTS

The anhydrous reactants employed in carrying out the process of this invention generally contain less that one-half percent by weight water and will ordinarily contain substantially less than one-half percent water. The commercially available technical anhydrous grades of cyanamide, methanol, and gaseous hydrogen chloride make quite suitable reactants.

The process of this invention is preferably carried out at reaction temperatures ranging from about 50° to about 70° C. At temperatures of about 70° C. the reaction occurs almost instantaneously; at temperatures of about 50° C. the reaction will be completed in about 1 to 2 minutes. It is likewise preferable that the reaction be carried out in the presence of about 100 to about 200 percent excess methanol. Such quantities provides sufficient fluidity of the reaction mixture and, simultaneously, result in acceptable crystallization yields.

The three reactants are preferably employed in a mole ratio of methanol to cyanamide to hydrogen chloride of about 2–4:1:1.

The rapid reaction and crystallization of product resulting therefrom allow the process of this invention to be readily adapted to a continuous process for preparing O-methylpseudourea hydrochloride. An example of a preferred continuous process is shown in the drawing. Referring to the drawing, anhydrous methanol 10 and anhydrous cyanamide 11 are premixed in vessel 12 to produce a methanolic solution 13 of cyanamide having a methanol to cyanamide mole ratio of about 1:1. Solution 13 is then continuously fed to reactor 14. A stream of anhydrous hydrogen chloride 15 is also continuously fed to reactor 14 so that the feed to reactor 14 contains substantially equimolar quantities of all three reactants (i.e., cyanamide, methanol, and hydrogen chloride).

Reactor 14 contains from 100 to 300 percent excess methanol and the contents of reactor 14 are maintained at 40° to 80° C. The reactants enter reactor 14 whereupon reaction occurs rapidly to produce crystals of O-methylpseudourea in the reaction mixture, thereby producing a slurry within reactor 14.

Slurry 16 containing crystallized product is continuously withdrawn from reactor 14 at a rate corresponding to the sum of the various input streams to reactor 14 so as to maintain a constant working volume within reactor 14. Slurry 16 can thereupon take one of two different routes. It may be fed to crystallizer 17, whereupon it is further cooled as, for example, to a temperature of 10° to 30° C. or below, in order to produce additional crystallization from the slurry mother liquor. In this connection, it has been observed that if slurry 16 is filtered immediately, without cooling, about 50 percent of the O-methylpseudourea hydrochloride contained therein is recovered; on the other hand, if the slurry is further cooled to 30° C. before filtration, about 65 percent of the O-methylpseudourea hydrochloride contained in the slurry is recovered. If desired, slurry 16 may optionally by-pass crystallizer 17 and be filtered immediately as shown by dotted line 16' in the drawing. This may occur, for example, in a case where a small amount of excess methanol is employed in reactor 14 so that a rather high yield of crystals is obtained. Likewise, it may be employed when the reactor temperature is on the low side of the above-described temperature range, so that the solubility of O-methylpesueourea hydrochloride in methanol is diminished. Similarly, in cases where the temperature in reactor 14 is in the higher portion of the acceptable temperature range, or a large amount of excess methanol is employed, it is preferable to additionally cool slurry 16 in crystallizer 17 in order to improve the product yield. Slurry 18 from crystallizer 17 or slurry 16 from reactor 14 is then filtered at 21 to separate the crystals from the mother liquor. This separation can be carried out using a variety of techniques beside filtration, such as, for example, centrifugation. Mother liquor 19 can be discarded but, since it contains a substantial amount of O-methylpseudourea, it is preferably recycled to reactor 14. The ultimate product yield can then approach quantitative. The amount of product retained in the mother liquor will, of course, depend upon a variety of factors such as, for example, the amount of excess methanol employed and the temperature to which slurry 16 is cooled in crystallizer 17. Typically the mother liquor can contain from about 20 to 50 percent product thereby showing the desirability of recycling the mother liquor to recover these large amounts of product.

The crystals 20 recovered by filter 21 are fed to dryer 22 where they are air-dried, preferably at room temperature, to remove small amounts of methanol 23 which can, if desired, be recovered and reused in the process. Essentially pure O-methylpseudourea hydrochloride 24 is then recovered from dryer 22.

In cases where mother liquor 19 is recycled to reactor 14, the rate of withdrawal of slurry 16 will, of course, be substantially equivalent to the rate of input of reactant streams 13 and 15 plus recycle stream 19 so as to prevent a build-up of volume in reactor 14. When the process is run continuously for prolonged periods of time, there is a danger of building up undesirable by-products, such as urea, in the final product due to the continuous recycle to mother liquor 19. To avoid this problem, some of the mother liquor can be continuously purged from the system such as is shown by purge line 25.

The following examples are provided to further illustrate the invention.

EXAMPLE 1

Anhydrous hydrogen chloride was passed over an agitated solution of 1.0 mole of anhydrous cyanamide in 90 ml. (2.25 mole) of anhydrous methanol. As the gas was absorbed, the temperature was allowed to rise to 50° C. where it was held by very gentle cooling. After about 75 percent of the theoretical 1.0 mole of hydrogen chloride has been absorbed, as judged by the increase in weight, crystallization of O-methylpseudourea hydrochloride began, and slightly greater cooling was required to maintain reaction temperature at 50° C. The theoretical amount of hydrogen chloride gas was added at an even rate over a period of 90 minutes, and the thick slurry produced was stirred for 30 minutes longer at about 50° C. It was then cooled to 30° C. and filtered. The crystalline product was pumped as free of mother liquor as possible and was then air-dried (89 g, m.p. 118°–121° C. dec.; 81 percent yield). Further cooling of the mother liquor to 10° C. gave 2.0 g. of additional product. The mother liquor was evaporated essentially to dryness, and the crystalline residue was extracted with about 25 cc. of acetone, leaving another 13.4 g. of slightly lower grade product, m.p. 112°–114° C. dec. Reevaporation of the acetone extract left 3.9 g. of partly crystalline syrup which appeared to be about half O-methylpseudourea hydrochloride plus some urea and possibly urea hydrochloride (as judged by IR). The total yield of satisfactory product was 94 percent.

EXAMPLE 2

Substantially the same procedure was followed as in Example 1 except that the reaction temperature was maintained at 40° C. instead of 50° C. Results were substantially those shown in Example 1.

EXAMPLE 3

Substantially the same procedure was followed as in Example 1 except that the reaction temperature was maintained at 80° C. and 4.0 mols of anhydrous methanol (300 percent excess) were employed in place of 2.25 mols of methanol of Example 1. Results were substantially those shown in Example 1.

EXAMPLE 4

Substantially the same procedure was followed as in Example 1 except that the reaction temperature was maintained at 40° C. and 2.0 mols of anhydrous methanol were used in place of the 2.25 mols of Example 1. Results were substantially those shown in Example 1.

EXAMPLE 5

This example illustrates the continuous production of O-methylpseudourea hydrochloride in accordance with the process of this invention.

A stirred reactor vessel is initially charged with anhydrous cyanamide and anhydrous methanol in a molar ratio of 1:2.3. Anhydrous hydrogen chloride is then admitted above the surface of the stirred reaction solution. When the exothermic reaction has raised the reaction temperature to about 60° C., external cooling is applied to maintain the temperature of the reaction mixture at 60° C. (± 2° C.) as the addition of hydrogen chloride (1.0 mole per mole of cyanamide) is completed. Additional anhydrous methanol, anhydrous cyanamide, and anhydrous gaseous hydrogen chloride are then continuously added to the reaction mixture at a substantially equimolar feed rate i.e. $CH_3OH/NH_2CN/HCl = 1/1/1$). The cyanamide and methanol are conveniently added together as a solution. The reaction mixture is maintained at about 60° C. Crystals of methylpseudourea hydrochloride product are formed producing a product slurry within the reaction vessel. The volume of the mixture in the reactor is held essentially constant by continuously withdrawing a product stream at substantially the same rate as the input to the vessel. This withdrawn stream is cooled to 25° C. whereupon additional crystallization of product occurs; it is then filtered to separate the crystallized O-methylpseudourea hydrochloride from the crystallization mother liquor. The mother liquor, consisting of a relatively dilute methanol solution of O-methylpseudourea hydrochloride, is continuously recycled to the reaction vessel to provide essentially steady state conditions in the reactor vessel as the process is continuously carried on for any desired length of run. The filter cake is dried at about room temperature to remove the small amount of adhering methanol. Less than 1 percent of by-product urea remains with the dried product. The methanol feed is corrected as required to balance the loss of methanol in the drying step. Overall yield is approximately 97 percent based on cyanamide and hydrogen chloride used. If the reaction is to run for a prolonged period, it is desirable to maintain a small purge of mother liquor in order to prevent a build-up of by-product urea in the reactor.

EXAMPLE 6

Substantially the same procedure was followed as in Example 5 except that the reaction mixture was maintained at a temperature of 40° C. and the reactor vessel was initially charged with 2.0 mols of anhydrous methanol instead of 2.25. In addition, the reactor vessel was designed to provide a residence time of about 2 minutes.

EXAMPLE 7

Substantially the same procedure was followed as in Example 5 except that the reaction temperature was maintained at 80° C. and the reactor vessel was initially charged with 4.0 mols of anhydrous methanol instead of the 2.3 mols of Example 5. The product yield was substantially that shown in Example 5.

I Claim:

1. In the process for preparing O-methylpseudourea hydrochloride by the reaction of methanol, cyanamide, and hydrogen chloride under anhydrous conditions;
    the improvement which comprises carrying out said reaction at temperatures of about 40° to about 80° C. and in the presence of about 100 percent to about 300 percent excess methanol.
2. The process of claim 1 wherein the temperature is from about 50° C. to about 70° C.
3. The process of claim 2 wherein about 100 percent to about 200 percent excess methanol is employed.
4. The process of claim 3 wherein the mole ratio of methanol to cyanamide to hydrogen chloride is about 2–4:1:1.
5. A process for the continuous production of O-methylpseudourea hydrochloride which comprises:
    a. continuously feeding anhydrous methanol, anhydrous cyanamide, and anhydrous hydrogen chloride into a vessel containing sufficient anhydrous methanol to provide from about 100 percent to about 300% excess methanol in said vessel;
    b. continuously maintaining the contents of said vessel at a temperature of about 40° C. to about 80° C. whereby crystals of O-methylpseudourea hydrochloride are continuously formed to produce a slurry within said vessel;
    c. continuously withdrawing the slurry thus formed at a rate substantially equal to the rate of input to said vessel; and
    d. continuously recovering said crystals from said slurry.
6. The process of claim 5 wherein said crystals are recovered by separating them from the crystallization mother liquor and wherein said mother liquor is continuously recycled to said vessel.
7. The process of claim 6 further including the step of continuously cooling said slurry after withdrawal from said vessel and prior to recovering the crystals therefrom to effect further crystallization of O-methylpseudourea hydrochloride.
8. The process of claim 6 wherein said temperature is from about 50° C. to about 70° C.; wherein about 100 percent to about 200 percent excess methanol is employed; and wherein the methanol, cyanamide, and hydrogen chloride are fed to said vessel at a substantially equimolar rate.
9. The process of claim 6 wherein said temperature is from about 50° C. to about 70° C.; and wherein about 100 percent to about 200 percent excess methanol is employed.
10. The process of claim 9 wherein the methanol, cyanamide, and hydrogen chloride are fed to said vessel at a substantially equimolar rate.

* * * * *